(12) United States Patent
Chan et al.

(10) Patent No.: US 11,455,013 B2
(45) Date of Patent: Sep. 27, 2022

(54) COMPUTING DEVICE AND MOUNT

(71) Applicant: Hewlett-Packard Development Company, L.P., Spring, TX (US)

(72) Inventors: Kenneth Chan, Spring, TX (US); Jose Ticy Lo, Spring, TX (US); Simon Wong, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/042,164

(22) PCT Filed: Jul. 19, 2018

(86) PCT No.: PCT/US2018/042877
§ 371 (c)(1),
(2) Date: Sep. 27, 2020

(87) PCT Pub. No.: WO2020/018105
PCT Pub. Date: Jan. 23, 2020

(65) Prior Publication Data
US 2021/0132657 A1 May 6, 2021

(51) Int. Cl.
*G06F 1/16* (2006.01)
*H01R 13/24* (2006.01)
*H01R 13/62* (2006.01)

(52) U.S. Cl.
CPC .......... *G06F 1/1632* (2013.01); *G06F 1/1626* (2013.01); *H01R 13/24* (2013.01); *H01R 13/6205* (2013.01)

(58) Field of Classification Search
CPC ............................ G06F 1/1632; G06F 1/1626
See application file for complete search history.

(56) References Cited

U.S. PATENT DOCUMENTS

| 8,873,233 | B2 | 10/2014 | Reber et al. |
| 9,195,267 | B2 | 11/2015 | Pan et al. |
| 9,429,994 | B1 | 8/2016 | Vier |
| 9,558,482 | B2 | 1/2017 | Hicks et al. |
| 9,823,702 | B2 | 11/2017 | Zhang et al. |
| 10,810,570 | B1* | 10/2020 | Martin ............... G06Q 20/3278 |
| 2008/0232061 | A1 | 9/2008 | Wang et al. |
| 2013/0277529 | A1 | 10/2013 | Bolliger |
| 2013/0335914 | A1 | 12/2013 | Lee |
| 2014/0133080 | A1 | 5/2014 | Hwang et al. |
| 2014/0148018 | A1* | 5/2014 | Kim ................... H01R 13/6205 439/39 |

(Continued)

FOREIGN PATENT DOCUMENTS

JP 2017027631 A 2/2017

*Primary Examiner* — Henry Tsai
*Assistant Examiner* — Christopher A Daley
(74) *Attorney, Agent, or Firm* — Brooks Cameron & Huebsch PLLC

(57) ABSTRACT

An example device can include a computing device having a first portion of a pogo pin connector coupled thereto and a mount having a second portion of the pogo pin connector coupled thereto to receive the first portion of the pogo pin connector. The mount can be communicatively coupled to a hub for receiving signals sent from the computing device, and the signals can be communicated from the computing device to the hub via the pogo pin connector in response to engagement of the first portion with the second portion.

14 Claims, 6 Drawing Sheets

(56) References Cited

U.S. PATENT DOCUMENTS

| | | | |
|---|---|---|---|
| 2015/0280343 A1* | 10/2015 | Hsu | H01R 13/2421 |
| | | | 29/884 |
| 2016/0259374 A1* | 9/2016 | Breiwa | H01F 38/14 |
| 2016/0294113 A1 | 10/2016 | Mehandjiysky et al. | |
| 2017/0140363 A1* | 5/2017 | Hicks | G06Q 20/322 |
| 2017/0179639 A1* | 6/2017 | Heiskanen | H01R 11/30 |
| 2020/0058008 A1* | 2/2020 | Hicks | G06K 7/0004 |
| 2021/0026409 A1* | 1/2021 | Miles | F16M 11/22 |

* cited by examiner

COMPUTING DEVICE AND MOUNT

BACKGROUND

Universal Serial Bus (USB) Type-C is a 24-pin USB connector system. A USB Type-C connector can connect to a host and/or a device and can allow for power delivery; signal delivery, and other communication delivery. Such deliveries can be bi-directional.

DETAILED DESCRIPTION

A docking station or "dock" provides a simplified way of connecting an electronic device such as the tablet or laptop computer to peripherals. Because a wide range of dockable devices—from mobile telephones to wireless mice—have different connectors, power signaling, and uses, docks may not be standardized. Some dock examples can allow for portable computing devices to dock and undock hot, cold, or standby. In a cold dock or undock, the computing device is shut down before docking/undocking. In a hot dock or undock, the computing device remains running when docked/undocked. Standby docking or undocking allows the computing device to be docked/undocked while in a sleep mode.

USB Type-C connectors are used for high-speed input/output (I/O) and power delivery. For instance, USB Type-C connectors are used in smartphones technologies and computing technologies (e.g., personal computers (PCs)). USB Type-C connectors utilize precise alignment and accurate push force to yield solid contacts without damage to a USB Type-C connector. This can affect reliability of the USB Type-C. The use of USB Type-C connectors for docking can create alignment, push force, and tolerance concerns for these reasons. In addition, USB Type-C connectors may cause challenges when docking at angles because of its vertical mount configuration and lack of support for docking without additional mechanical parts.

Examples of the present disclosure provide for docking using pogo pins that simulate behavior of a USB Type-C. As used herein, a pogo pin is a device used in electronics to establish a connection between two printed circuit boards (PCBs). Pressed between two electronic circuits, points at each end of the pogo pin can make contacts with two electronic circuits, connecting the two electronic circuits together. Some examples can include docking a computing device such as a tablet to a mount via pogo pins. Signals, power, and other communication can be between the computing device and a hub. The pogo pin connection can follow a USB Type-C connector protocol in some instances.

In some examples, pogo pins can allow for docking the computing device at different angles, as opposed to flat orientations, which can be desired in point-of-sale environments. In addition, the computing device can be resiliently connected to the mount to allow for docking and undocking of the computing device. Magnetic connections may be used in some instances to aid in docking of the computing device to the mount.

Figure 1:
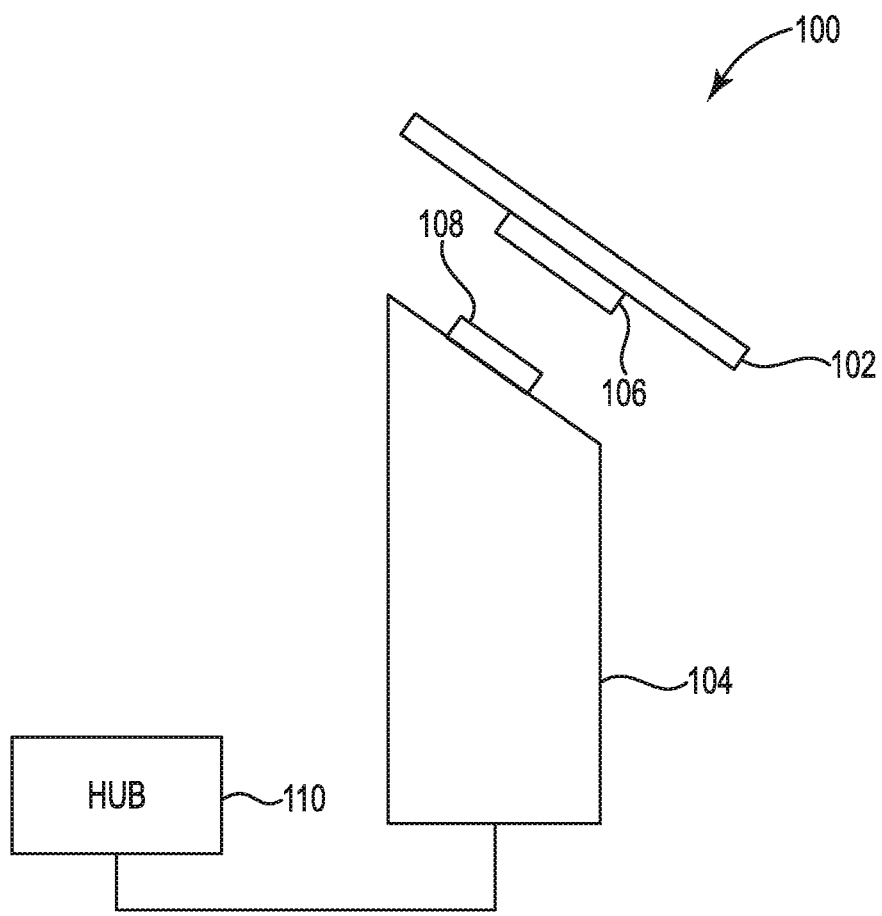
FIG. 1 illustrates a diagram of a system including a computing device, a mount, and a hub according to an example.

FIG. 1 illustrates a diagram of a system 100 including a computing device 102, a mount 104, and a hub 110 according to an example. System 100 may be used in a retail point-of-sale application in some examples. For instance, system 100 may be used in a retail setting such that a user can dock and undock computing device 102 from mount 104 and travel around the retail environment with computing device. For example, a user may show a customer options on computing device 102 while on a sales floor, return to mount 104, and dock computing device 102 to mount 104 to complete a sale. Computing device 102 can include a computing device that can function and maintain power while docked or undocked from mount 104. For instance, computing device has sufficient processing and memory capabilities to function undocked from mount 104. An example includes a tablet computing device.

Computing device 102 can have a first portion 106 of a pogo pin connector coupled thereto, and mount 104 can have a second portion 108 of the pogo pin connector coupled thereto. Second portion 108 can receive first portion 106 during docking of computing device 102 to mount 104. First portion 106 can engage with second portion 108 to simulate a USB Type-C connection. For instance, the engagement can include the use of an enhanced high speed pogo with a USB Type-C connector protocol. This can include the pogo pin connector performing functions analogous to those of a USB Type-C connector including facilitation of high speed communication signals and power signals between computing device 102 and hub 110.

The enhanced high speed pogo can include the pogo pins of the pogo pin connector supporting high speed signals (e.g., up to 10 gigabits per second (Gbps)), as compared to other pogo pin connections with speeds of 400 megabits per second. The pogo pins, which can total 24 pins between first portion 106 and second portion 108 can support USB3.1 Gen 1 (5 Gbps) and display port 1.2 (4.7 Gbps) speeds. The 24 pogo pins can cover CC line, USB2, USB3.1 Gen1, display port 1.2×2 lane, VBUS, GND, and other peripheral signals. Particular pogo pins with particular functions can be placed strategically so as to reduce cross-talk and interference between high-speed signals communicated across the pogo pins and to maintain signal integrity. The pogo pins, both on first portion 106 and second portion 108 can be formed in a curved shape.

In some examples, mount 204 can be communicatively coupled to hub 110, which can receive signals sent from computing device 102. As used herein, "communicatively coupled" can include coupled via various wired and/or wireless connections between devices such that data can be transferred in various directions between the devices. The coupling need not be a direct connection, and in some examples, can be an indirect connection. For instance, the signals can be sent from computing device 102 to hub 110 via the pogo pin connector in response to engagement (e.g., docking) of first portion 106 with second portion 108. Signals can be sent, in some instances, from hub 110 to computing device 102 via the pogo pin connector. The signals sent between computing device 102 and hub 100 can include power and communication signals, for instance.

In some examples, computing device 102 and mount 104 can include components to create a magnetic connection between computing device 102 and mount 104. For instance, when computing device 102 is near mount 104 in preparation for docking, magnetic components can suck computing device 102 (and first portion 106 of the pogo pin connector) to mount 104 (and second portion 108 of the pogo pin connector) to automatically adjust and align a docking position of computing device 102. Computing device 102 can be locked in the position, which may be predefined, and pogo pins of first portion 106 and pogo pins of second portion 108 are contacted firmly on both sides. As used herein, "automatically" can include being aligned and/or adjusted with limited or no user input and/or with limited or no prompting. For instance, computing device 102 can be adjusted and aligned in response to a docking process and a proximity of magnetic components, and thus the adjusting and aligning is said to be automatic.

Magnetic components can improve dockability of computing device 102 to mount 104 in some examples. For instance, other approaches to docking include deep insertion of connection pins. However, magnetic components as described herein can allow for a shallower connection of pogo pins while maintaining reliability and security of connections. Pogo pin connections can have longer life expectancies as compared to other connections, including USB Type-C connections, so a pogo pin connection that simulates a USB-Type-C connection as described herein can improve reliability of docking while maintaining a high-speed signal capability of a USB Type-C connector.

Figure 2:
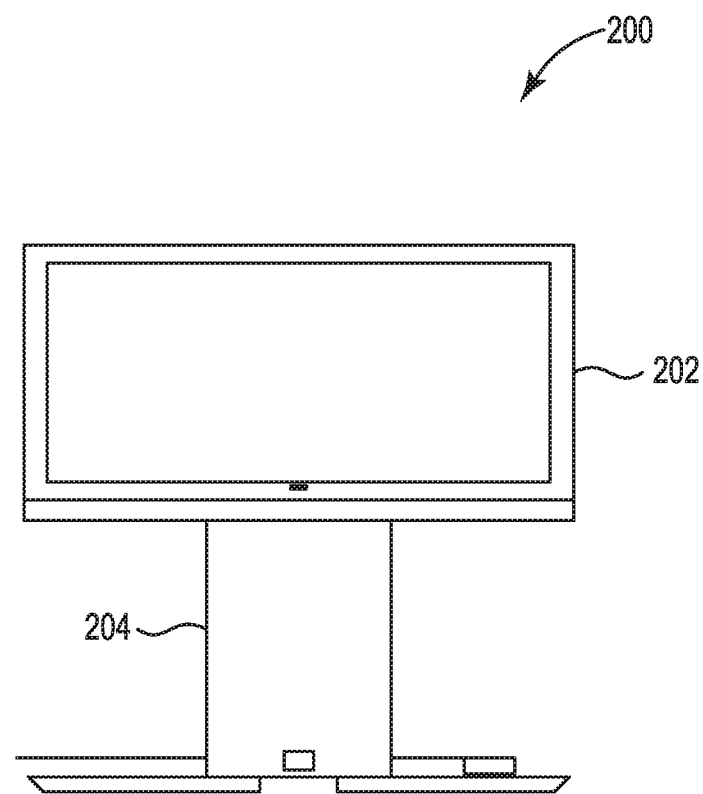
FIG. 2 illustrates a front view of a device including a computing device and a mount according to an example.

FIG. 2 illustrates a front view of a device 200 including a computing device 202 and a mount 204 according to an example. Device 200 can be analogous to system 100, in some examples. Device 200 can include computing device 202 resiliently coupled to mount 204 via the enhanced high speed pogo. The coupling can be resilient, such that the coupling is releasable, removable, detachable, etc. For instance, the coupling of computing device 202 to mount 204 may not be a permanent coupling. For example, computing device 202 can undocked from mount 204 and used separately from device 200.

Figure 3:
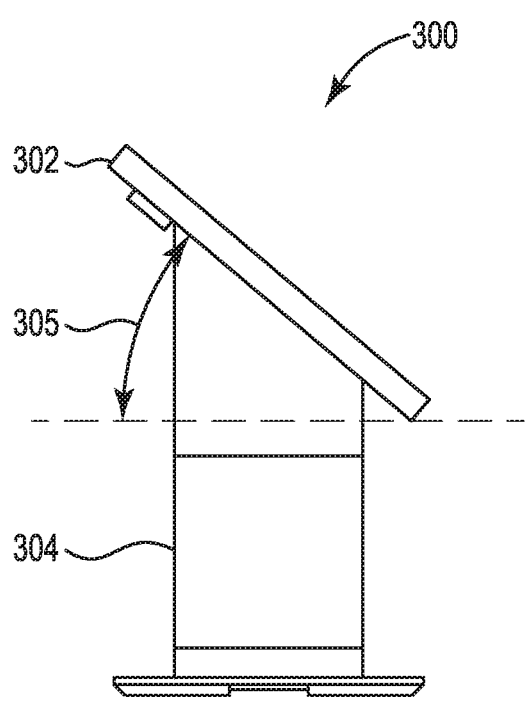
FIG. 3 illustrates a side view of a device including a computing device and a mount according to an example.

FIG. 3 illustrates a side view of a device 300 including a computing device 302 and a mount 304 according to an example. Device 300 can be analogous to system 100 and/or device 200, in some examples. Device 300 can include computing device 302 resiliently coupled to mount 304 via an enhanced high speed pogo. The enhanced high speed pogo can include a first portion of a pogo pin connector (not illustrated in FIG. 3) coupled to computing device 302 and resiliently connected to a second portion of the pogo pin connector. The second portion can be coupled to mount 304. In some examples, the USB Type-C connection can allow for power and communication signals (e.g., high-speed communication signals) to be sent from computing device 302 to a hub.

Mount 304, in some examples, can be cylindrical, however other shapes are possible. The second portion of the pogo pin connector can be coupled to a face of mount 304, which can be angled. This angling results in computing device 302 being angled, for instance as illustrated at 305. The angle can be approximate 45 degrees in some examples but can be a greater or lesser angle. The angle can allow for improved user interaction with computing device 302. For instance, an angled computing device 302 may be easier to see and interact with in a retail point-of-sale environment.

Mount 304, in some instance, can be hollow and/or can house components including a printing device. For instance, in an example where device 300 is used in a point-of-sale environment, a receipt printer may be housed inside of mount 304. In such an example, a transaction may be completed on computing device 302, and a printing device housed within mount 304 may be used to print a receipt for the purchasing customer. In some instances, the printing device can be built into mount 304.

Figure 4:
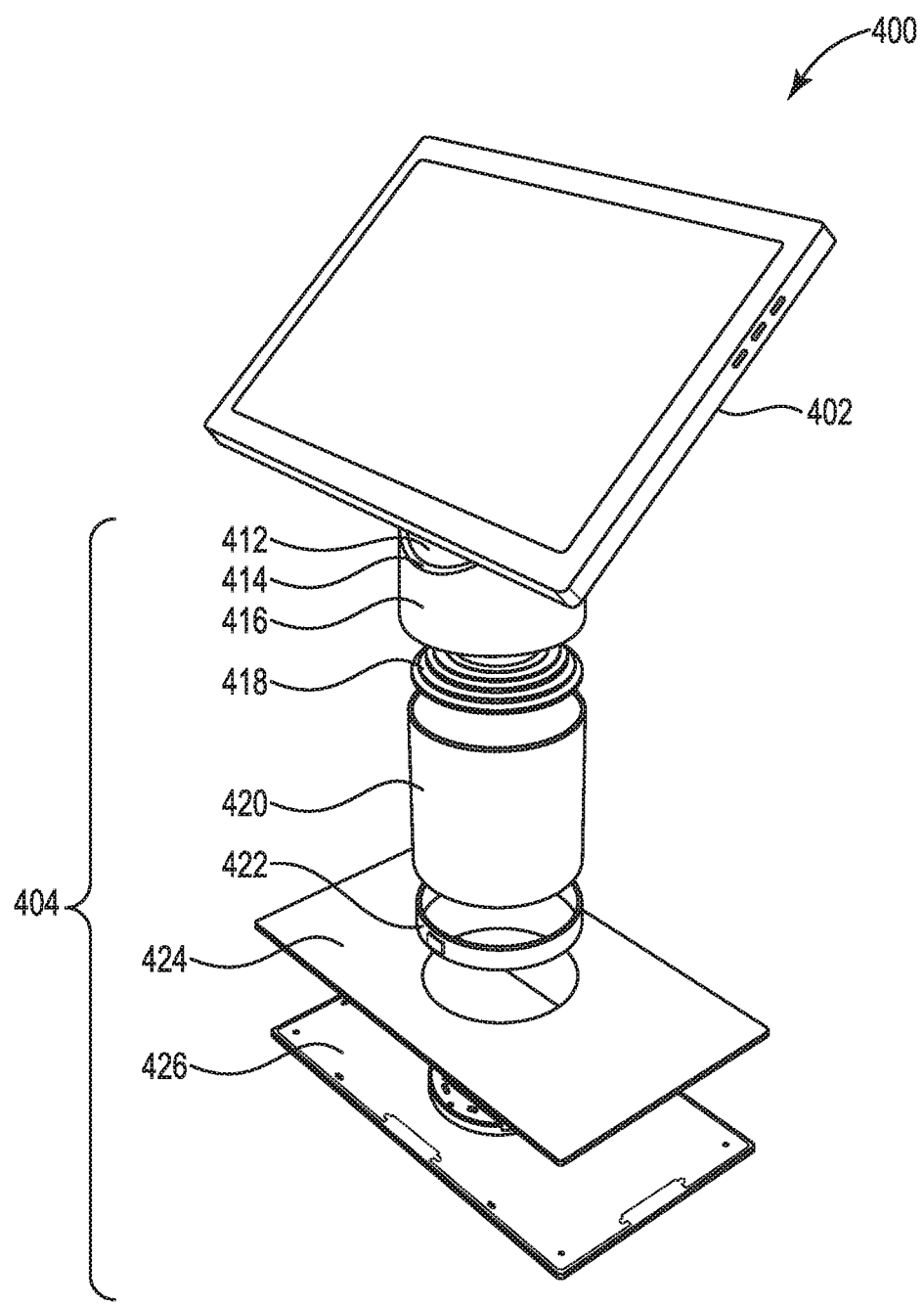
FIG. 4 illustrates an exploded view of a device including a computing device and a mount according to an example.

FIG. 4 illustrates an exploded view of a device 400 including a computing device 402 and a mount 404 according to an example. Device 400 can be analogous to system 100, device 200, and/or device 300, in some examples. Device 400 can include computing device 402 resiliently coupled to mount 404 via an enhanced high speed pogo. In some examples, mount 404 can include a plurality of components including plate cover 412 and protective cover 414 on a face of mount 404. Plate cover 412 and protective cover 414 can protect portions of a pogo pin connector functioning as the.

Mount 404 can include upper column 416 having an angled face, and upper column 416 can be connected to lower column 420 via pivot mechanism 418, Pivot mechanism 418 can allow for twisting of upper column 416 (and in turn, computing device 402). For example, a user in a retail point-of-sale environment can turn computing device 402 to show a customer something on a screen of computing device 402. The turn can take place at pivot mechanism 418.

Mount 404 can include a bottom puck 422 and a base including top cover 424 and bottom plate 426. Bottom puck 422 can connect lower column 420 to the base, which can be used to hold device 400 upright or attach device 400 to a table or other location. In some examples, bottom puck 422 has a button to electronically control locking and unlocking the mechanism between 402 and 404. In some instances, mount 404 can be hollow. Cables for power and/or communication signals sent between computing device 402 and a hub may be housed in mount 404. A printing device or other component may be housed in mount 404, Mount 404, in some instance may not be hollow, but may have routes for passage of cables or other components.

Figure 5:
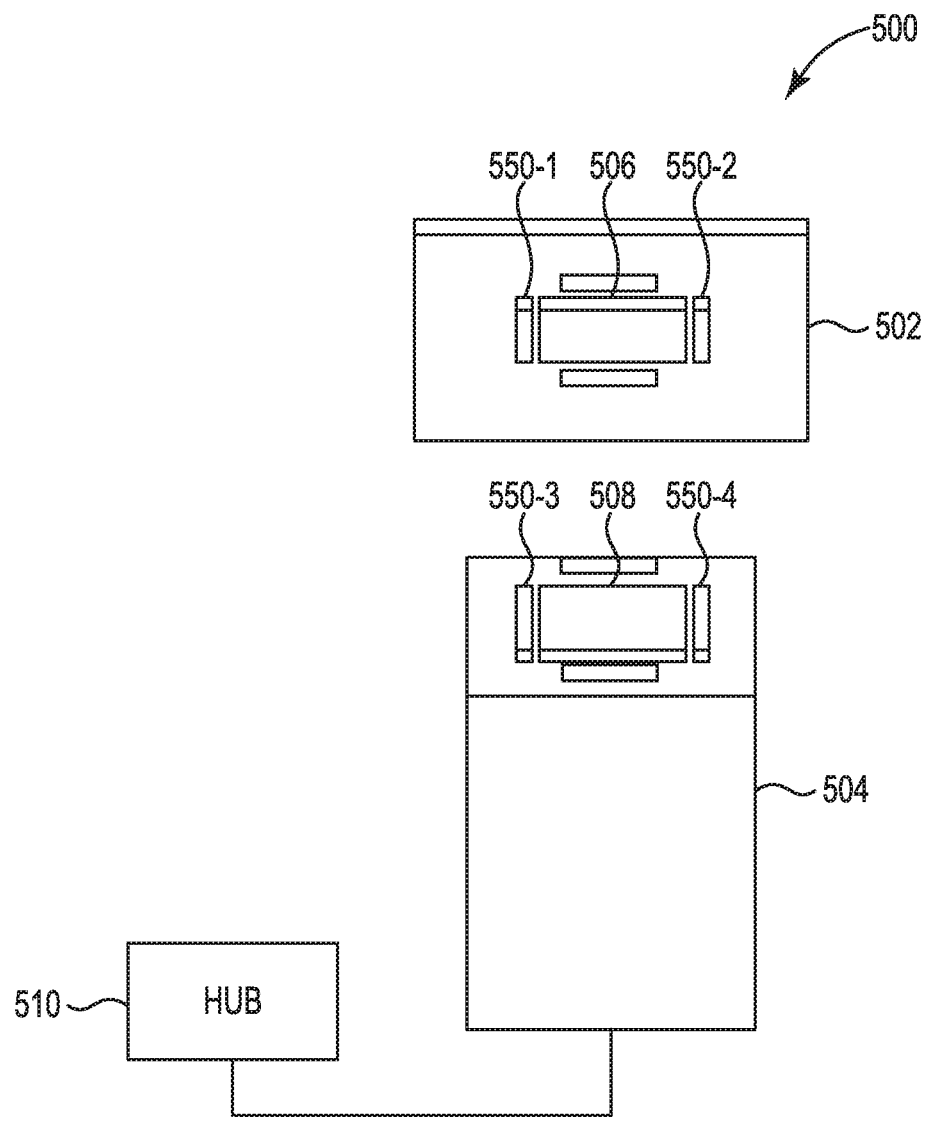
FIG. 5 illustrates a system including a back view of a computing device, a front view of a mount, and a hub according to an example.

FIG. 5 illustrates a system 500 including a back view of a computing device 502, a front view of a mount 504, and a hub 510 according to an example. System 500 can be analogous to system 100, device 200, device 300, and/or device 400, in some examples. System 500 can include computing device 502 having a first portion 506 of a pogo pin connector and magnetic components 550-1 and 550-2, While two magnetic components are illustrated on computing device 502, more or few than two may be present, and they may be located in different positions than the positions illustrated in FIG. 5.

System 500 can also include mount 504 having an angled face (see angle 305 in FIG. 3) to receive computing device 502. Mount 504 can include a second portion 508 of the pogo pin connector coupled to the face of mount 504 to receive first portion 506 to dock computing device 502 and create an enhanced high speed pogo. Mount 504 can include magnetic components 550-3 and 550-4 coupled to the face of mount 504 to receive magnetic components 550-2 and 550-1, respectively. While two magnetic components are illustrated on mount 504, more or few than two may be present, and they may be located in different positions than the positions illustrated in FIG. 5.

Magnetic components 550-1, 550-2, 550-3, and 550-4, which may include magnets or other components able to connect to one another, can adjust and align a position of computing device 502 during docking of computing device 502 to mount 504. For instance, if a user tries to dock computing device 502 to mount 504 via the pogo pin connector (e.g., first portion 506 and second portion 508), but is slightly off in aligning the two portions 506 and 508, magnetic components 550-1, 550-2, 550-3, and 550-4 can automatically adjust and align computing device 502 into a predefined docking position. The position may be predefined such that pogo pins are properly aligned for a complete connection. In some examples, magnetic components 550-1, 550-2, 550-3, and 550-4 can prevent damage to the pogo pins during docking through automatic adjustment and alignment.

In some examples, system 500 can include hub 510. Hub 510 can be communicatively coupled to computing device 502 via the enhanced high speed pogo connection. As used herein, hub 510 can include a network hub or a USB hub. For instance, hub 510 can include a device that allows multiple computers to communicate with each other over a network or a device that allows multiple peripherals to connect through a single USB port. In some examples, hub 510 can be other devices that can communicate power and communication signals to and from computing device 602. For instance, hub 510 can include a device that receives a signal from computing device 502 and displays the signal to a graphical user interface such as a monitor.

Figure 6:
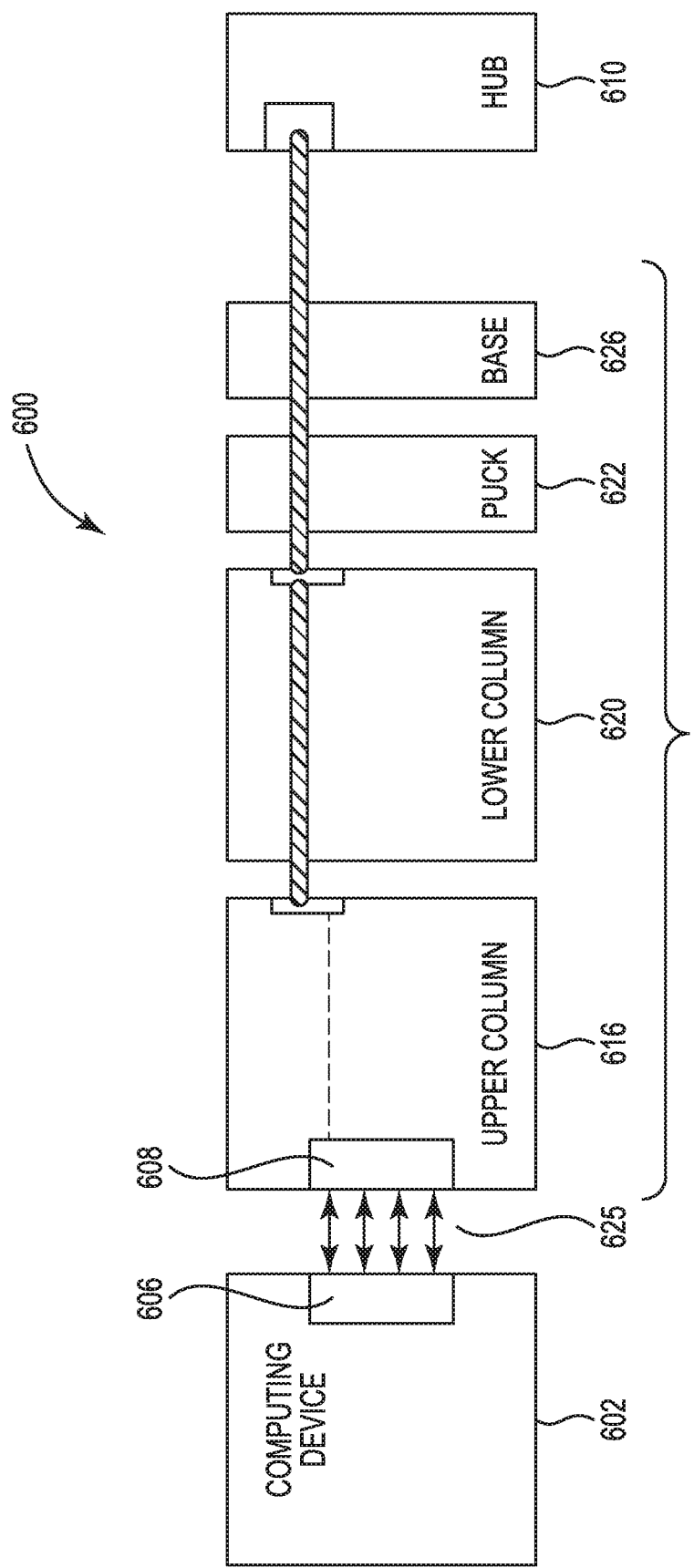
FIG. 6 illustrates another diagram of a system including a computing device, a mount, and a hub according to an example.

FIG. 6 illustrates another diagram of a system 600 including a computing device 602, a mount 604, and a hub 610 according to an example. System 600 can be analogous to system 100, device 200, device 300, device 400, and/or system 500, in some examples. System 600 includes computing device 602 communicatively coupled to hub 610 via an enhanced high speed pogo connection 625. The connection between 606 and 608 can be performed via the enhanced high speed pogo derived from the USB Type-C protocol to simplify data communication between devices. First portion 606 can be located on (e.g., coupled to) computing device 602, and second portion 608 can be located on (e.g., coupled to) upper column 616 of mount 604.

Mount 604 can house cables, devices, or other components to facilitate communication between computing device 602 and hub 610. Additionally or alternatively, cables, devices, or other components may be housed within mount 604 for other purposes (e.g., a printing device). Computing device 602 can be resiliently coupled (and communicatively coupled) to upper column 616 via the pogo pin connector and its portions 606 and 608. Connections to communicatively couple components of mount 604 (e.g., upper column 616, lower column 620, bottom puck 622, base 626 (e.g., including top cover and bottom plate)) to one another and to hub 610 can include USB Type-C cables, and USB Type-C E-mark cables, among others.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. A device, comprising:
   a computing device having a first portion of a pogo pin connector coupled thereto wherein the first portion of the pogo pin connector simulates a USB type-C connection when coupled to a second portion of the pogo pin connector; and
   a mount having the second portion of the pogo pin connector coupled thereto to receive the first portion of the pogo pin connector,
      wherein the mount is communicatively coupled to a hub for receiving signals sent from the computing device; and
      wherein the signals are communicated from the computing device to the hub via the pogo pin connector in response to engagement of the first portion with the second portion.

2. The device of claim 1, further comprising components on the computing device and the mount to create a magnetic connection between the computing device and the mount.

3. The device of claim 1, further comprising the computing device to receive signals from the hub via the mount.

4. The device of claim 3, further comprising the computing device to send and receive power and communication signals to and from the hub.

5. A system, comprising:
   a computing device resiliently coupled to a mount via an enhanced high speed pogo connection, wherein the enhanced high speed pogo connection comprises:
      a first portion of a pogo pin connector coupled to the computing device, wherein the first portion of the pogo pin connector simulates a USB type-C connection when coupled to a second portion of the pogo pin connector; and
      the second portion of the pogo pin connector coupled to the mount and resiliently coupled to the first portion;
   a hub to receive power and communication signals sent from the computing device via the enhanced high speed pogo connection.

6. The system of claim 5, wherein the first and the second pogo pin connectors comprise 24 total pogo pins.

7. The system of claim 5, wherein the communication signals sent from the computing device are high-speed signals.

8. The system of claim 5, further comprising:
   a first magnetic component coupled to the computing device; and
   a second magnetic component coupled to the mount to;
      receive the first magnetic component; and
      automatically align and adjust docking of the computing device to the mount.

9. The system of claim 5, wherein the computing device is a retail point-of-sale computing device.

10. A device, comprising:
    a computing device, comprising:
       a first portion of a pogo pin connector; and
       a first magnetic component; and
    a mount having an angled face to receive the computing device, comprising:
       a second portion of the pogo pin connector coupled to the face of the mount to:

receive the first portion of the pogo pin connector to dock the computing device and create an enhanced high speed pogo connection, wherein the enhanced high speed pogo pin connection is a simulated USB type-C connection; and a second magnetic component coupled to the face of the mount to:

receive the first magnetic component; and adjust and align a position of the computing device.

11. The device of claim 10, further comprising the second magnetic component to receive the first magnetic component to automatically adjust and align a position of the computing device.

12. The device of claim 10, wherein the computing device functions docked to the mount and undocked from the mount.

13. The device of claim 10, further comprising a printing device housed inside the mount.

14. The device of claim 10, further comprising the second magnetic component to adjust and align a position of the computing device to a predefined position during docking of the computing device to the mount.

\* \* \* \* \*